United States Patent [19]

Gou et al.

[11] Patent Number: 4,948,554

[45] Date of Patent: Aug. 14, 1990

[54] NATURAL CIRCULATING PASSIVE COOLING SYSTEM FOR NUCLEAR REACTOR CONTAINMENT STRUCTURE

[75] Inventors: Perng-Fei Gou; Gentry E. Wade, both of Saratoga, Calif.

[73] Assignee: General Electric Company, San Jose, Calif.

[21] Appl. No.: 294,095

[22] Filed: Jan. 6, 1989

[51] Int. Cl.$^5$ .............................................. G21C 15/18
[52] U.S. Cl. ..................................... 376/283; 376/293
[58] Field of Search ............... 376/283, 293, 298, 299, 376/282, 367; 165/104.21, 104.22

[56] References Cited

U.S. PATENT DOCUMENTS

| | | | |
|---|---|---|---|
| 3,718,539 | 2/1973 | West et al. | 376/283 |
| 4,036,291 | 7/1977 | Kobayashi et al. | 165/104.21 |
| 4,394,346 | 7/1983 | Morooka | 376/258 |
| 4,478,784 | 10/1984 | Burelbach | 376/298 |
| 4,560,533 | 12/1985 | Huebotter et al. | 376/367 |
| 4,666,661 | 5/1987 | Fredell et al. | 376/299 |
| 4,759,901 | 7/1988 | Wachholz et al. | 376/299 |

FOREIGN PATENT DOCUMENTS

| | | | |
|---|---|---|---|
| 1099828 | 4/1981 | Canada | 376/367 |
| 1614547 | 8/1970 | Fed. Rep. of Germany | 376/283 |
| 63-33697 | 2/1988 | Japan | 376/367 |
| 63-223593 | 9/1988 | Japan | 376/283 |

*Primary Examiner*—Daniel D. Wasil
*Attorney, Agent, or Firm*—Robert R. Schroeder

[57] ABSTRACT

A passive cooling system for the contaminant structure of a nuclear reactor plant providing protection against overpressure within the containment attributable to inadvertent leakage or rupture of the system components. The cooling system utilizes natural convection for transferring heat imbalances and enables the discharge of irradiation free thermal energy to the atmosphere for heat disposal from the system.

7 Claims, 6 Drawing Sheets

NATURAL CIRCULATING PASSIVE COOLING SYSTEM FOR NUCLEAR REACTOR CONTAINMENT STRUCTURE

The Unites States Government has rights in this invention pursuant to Contract No. DE-AC03-86SF16563 awarded by the U.S. Department of Energy.

FIELD OF THE INVENTION

This invention relates to liquid cooled, nuclear fission reactor plant complexes. The invention is particularly concerned with a passive or self-acting cooling system for the containment structure housing a fissionable fuel containing nuclear reactor.

BACKGROUND OF THE INVENTION

Typically nuclear fission reactors for power generation are housed within a containment structure as a safety measure. Nuclear reactor containments are designed and employed to enclose the nuclear reactor pressure vessel containing the core of heat generating fissionable fuel and ancillary components of the system, such as portions of the coolant/heat transfer conduits or other means which constitute a source and/or means of conveyance of radiation and/or radioactive fission products. As such, the containment structure housing a nuclear reactor must effectively isolate the reactor system and components enclosed within its confines by sealing in all contents including any water, steam, gases or vapor and entrained fission products or other sources of radiation that may have escaped from the reactor pressure vessel and in particular its associated cooling system.

The provision of a construction fulfilling such requirements with an effective fluid impermeable confinement structure securely isolating its enclosed contents from the external atmosphere does not generally present either a significant engineering or construction obstacle or achievement.

However, in the event of certain malfunctions in a nuclear reactor system, such as a loss of coolant, large volumes of very hot pressurized water may be released from the system into the interior of the containment structure. This very hot pressurized water flashes into steam which may carry along radioactive fission products, and substantially increase the pressure and temperature within the containment structure. Such accidents can produce very high pressures and temperatures within the confines of the "leak proof" containment structure thereby imposing heavy demands upon its integrity and ability to perform its designed role of retaining all potentially hazardous matter derived from the nuclear reactor system.

Potentially deleterious high pressure due to the inherent high thermal energy and flashing steam cannot simply be released by venting from the containment or otherwise permitted to escape to the outside atmosphere since the steam vapor may entrain and carry radioactive fission products which would also be released into the environment.

A variety of suppression schemes have been proposed and devised to cope with the problem of excessive pressure. They include a variety of measures or arrangements for condensing evolving or flashing steam and reducing the resultant over-pressure caused by accidents, for example, the designs disclosed in U.S. Pat. Nos. 3,713,968; 4,362,693; 4,473,528; and 4,526,743.

In the absence of an effective suppression means to mitigate steam generated high pressures, the enveloping containment structure must be designed and constructed at excessively high costs and maintained to resist and retain inordinately high internal fluid pressures. Nevertheless, even a significantly reinforced containment structure cannot be assured to be resistant to breaching considering the temperature/pressure potential of a typical power generating nuclear reactor plant.

Under malfunctioning conditions, the decay heat produced by the core of fissionable fuel within the pressure vessel is released into the containment via either a pressure suppression vent system or the pressure vessel safety and depressurization valves. In conventional reactor assemblies this excess thermal energy is commonly removed by active cooling systems comprising motors, pumps, valves and heat exchangers. Functioning of these acting components depends upon external power and/or proper operator personnel actions.

SUMMARY OF THE INVENTION

This invention comprises a naturally circulating passive cooling system for the containment structure of a nuclear fission reactor plant. The cooling system provides means for lowering the temperature of the interior environment of a reactor containment to relieve or preclude over-pressure therein by reducing ambient temperatures and thus condensing steam. The passive cooling system entails a naturally circulating heat transfer mechanism that additionally permits the safe dissipation of thermal energy out into the environment free of contaminating radioactive fission products.

OBJECTS OF THE INVENTION

It is a primary object of this invention to provide a new and improved containment cooling system for nuclear fission reactor plants.

It is also an object of this invention to provide a natural circulating cooling system for nuclear fission reactor containment structures.

It is a further object of this invention to provide functional improvements in a nuclear reactor containment comprising a passive or self-acting cooling system based upon convection heat transfer of fluids.

It is a still further object of this invention to provide passive pressure suppression system based upon natural heat convection for containment structures of nuclear reactor plants.

It is another object of this invention to provide a cooling system for nuclear fission reactor containment structures which is based upon natural circulation for heat transfer

DETAILED DESCRIPTION OF THE INVENTION

Figure 1:
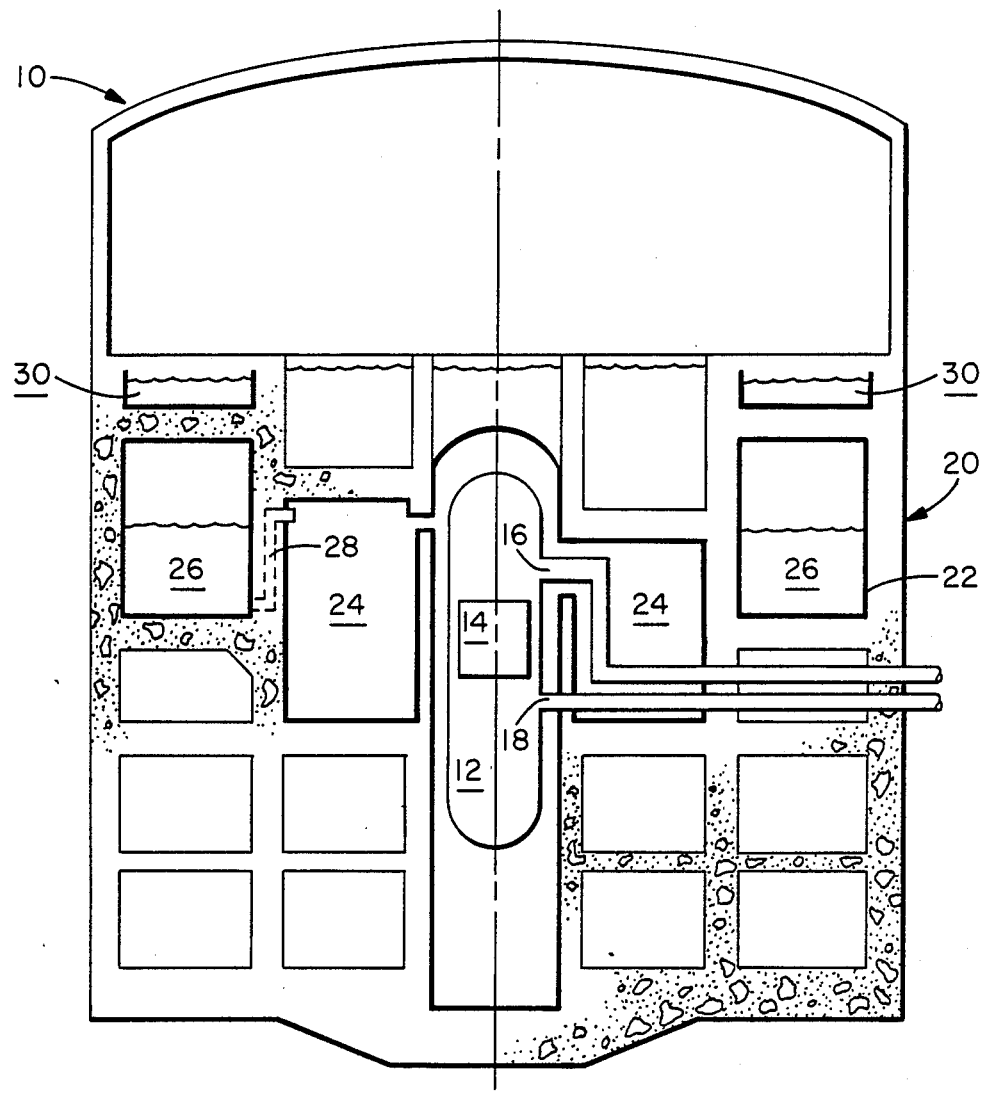
FIG. 1 is a vertical sectional view of a containment structure housing a nuclear reactor plant with part in elevation.

Referring to the drawings, in particular FIG. 1, a nuclear reactor plant complex 10 comprises the nuclear reactor consisting of a pressure vessel 12 containing a heat producing core of fissionable fuel 14. The fuel gives up its generated heat from fission to a surrounding coolant, typically comprising water for either the direct generation of steam as in a so-called boiling water reactor, or to function as heat transfer medium for the indirect generation of steam as in a so-called pressure water reactor. Coolant circulating pipes 16 and 18 provide for the circulation of coolant water into the reactor pressure vessel 12 for transfer of the heat output of the fuel, and conveyance of the heated water and/or steam from the pressure vessel to its use such as electrical power generation whereupon it recycles through the circuit.

The nuclear reactor comprising its pressure vessel 12 with fuel core 14 and certain related components is enclosed within a containment structure 20. The containment structure 20 includes a fluid impermeable liner 22 on the structure, which includes a base or floor(s), a vertical side wall(s) and dome or roof(s) which is designed to prevent the escape from the confines of any radioactive material to the outer atmosphere.

In a typical water cooled nuclear reactor plant, the containment structure 20, in addition to the reactor pressure vessel 12 includes a number of cell-like chambers or compartments designed for the performance of specific functions or objectives. For instance, the reactor pressure vessel 12 can be surrounded by one or more adjacent chambers providing a drywell(s) 24 to receive and retain any overflow or spillage of water, steam or other vapor resulting from leakage or other sources in connection with the reactor operation.

One or more chambers partially filled with water provide a suppression pool(s) 26 for cooling and condensing steam beneath the surface of water pool therein. Suppression pool chamber(s) 26 is in fluid communication with one or more drywell chambers 24 through conduits 28 which open at one terminal end into an upper portion of drywell chamber 24 and at its other terminal end into the suppression pool chamber 26 at a lower region below the surface of the water pool contained therein. Thus, any steam escaping or flashing from water leaking from the high temperature and pressure confines of the pressure vessel and its connecting circuits will be received in the drywell chamber(s) 24. The inherent pressure of the steam escaping or flashing from emerging hot water will ultimately be forced from the drywell chamber(s) 24 through conduit(s) 28 into the suppression pool chamber(s) 26 at a location beneath the surface of the water pool therein. The submerged contact of the steam with the pool water condenses it and thereby reduces the steam increased pressures within the containment structure 20 initially produced by the leaking steam or flashing from escaping high temperature and pressure water.

In accordance with one version of the invention, one or more compartments containing water comprising a cooling pool(s) 30 is preferably provided overhead and adjacent to the suppression pool chamber(s) 26.

The passive cooling systems of this invention are closed to contaminating radioactive fission products and comprise the application of one or more heat transferring containers 32, and their utilization in several embodiments. The heat transferring containers 32, as employed in this invention, consist of a tank-like vessel or receptacle, which may be elongated as a closed section of pipe. Enclosed within this container 32 is a fluid having a boiling point in an apt temperature range, for example about 50 to 150° C., and a relatively high heat of vaporization (or evaporation) such as water. In addition to the foregoing physical properties, the fluid should be chemically innocuous with respect to other components and materials of the overall system, namely the fluid should not chemically attack or be reactive with any component of possible contact.

Figure 2:
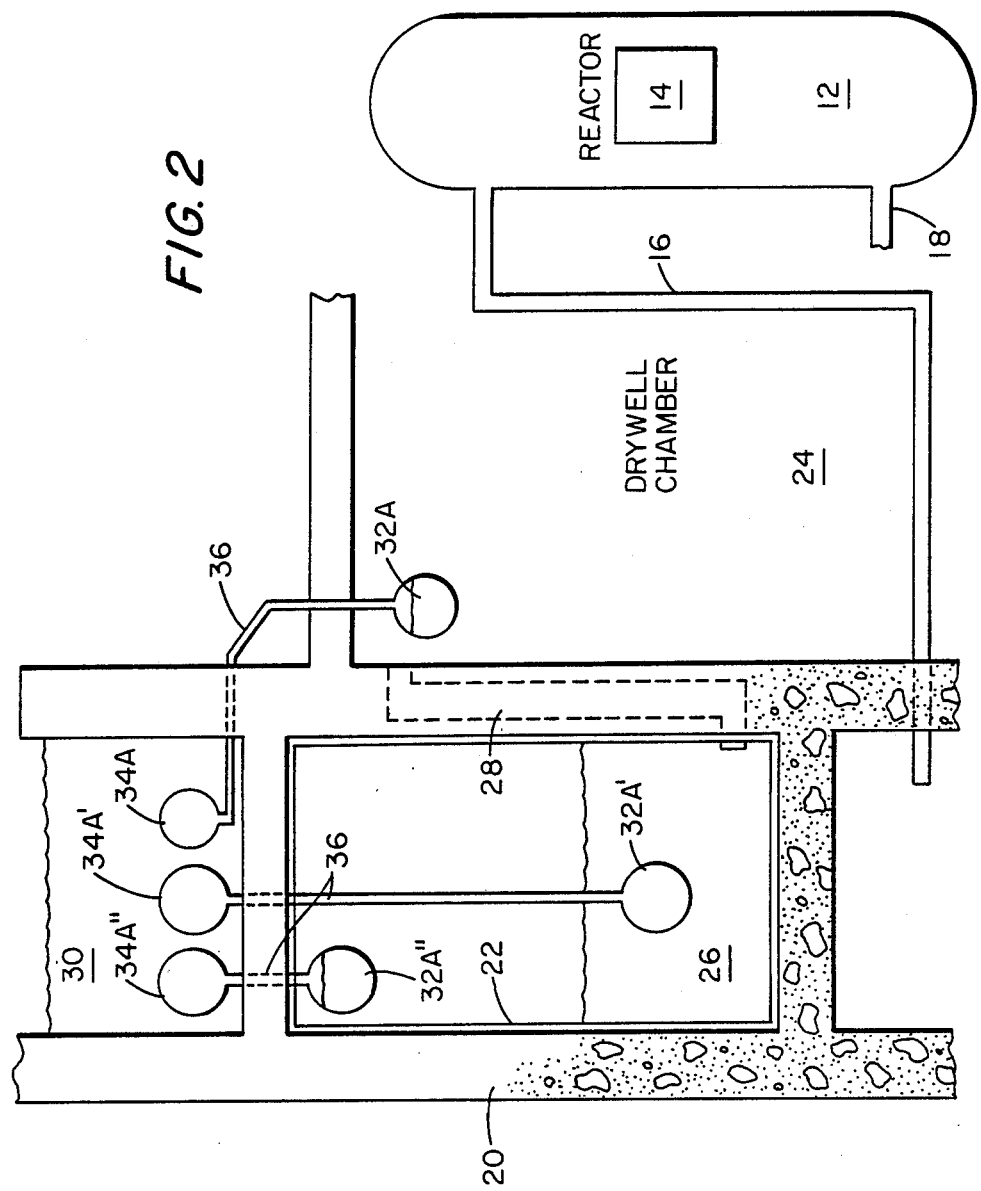
FIG. 2 is a detailed, enlarged sectional view of a portion of a suppression pool chamber and overhead cooling pool compartment shown in FIG. 1.

Referring to FIG. 2, one embodiment of the closed cooling system comprises at least one heat transferring container 32A located adjacent to the pressure vessel 12, such as within the drywell chamber 24, whereby the container(s) 32A will be aptly exposed to any excessive thermal energy escaping from the pressure vessel 12 or its associated cooling circuit such as conduits 16 and 18. Container(s) 32A of this embodiment of the closed cooling system is in fluid communication with at least one condensing container 34A through one or more ducts 36. Condensing container 34A in this embodiment is positioned submerged in cooling pool compartment 30 and above heat transferring container 32.

In accordance with the natural convection fluid heat transferring mechanisms of the closed cooling system of this invention, the excessive thermal energy emanating from the reactor dispenses and contacts the heat transferring container(s) 32A, whereby the thermal energy is transferred to the liquid contents of container(s) 32A heating it until it reaches its boiling point and thus vaporizes. The vaporized liquid carrying therewith thermal energy expands through the system traveling through duct(s) 36 to the condensing container(s) 34A which is submerged in the pool of a cooling compartment 30. Upon reaching the cooling environment of the submerged condensing container(s) 34A, the hot vapor is cooled and condensed back to a liquid giving up its previously transferred thermal energy from the condensing container(s) 34A to the surrounding pool of a cooling compartment 30. The cooled condensed liquid will flow back by gravity to container(s) 32A.

Since the liquid pool of the cooling compartment 30 is physically isolated from the reactor system and the cooling arrangement described, appropriate thermal energy introduced into this component can be discharged by any apt means out into the atmosphere without any possibility of releasing radioactive material or radiation.

Variations on this embodiment of the closed cooling system of this invention comprise locating the heat transferring container(s) 32 in a suppression pool chamber 26, either submerged in the pool, such as container 32A[1], or above the surface of the pool, such as container 32A[11]. Heat transfer containers 32A[1] or 32A[11] are in fluid communication with a corresponding condensing container 34A[1] or 34A[11], located submerged in the cooling compartment 30, through a duct(s) 36. Thus, excess thermal energy from the reactor which is discharged into the suppression pool chamber, can be transferred out therefrom via natural convection, from the suppression pool chamber(s) 26 by means of either heat transferring container(s) 32 to a cooling compartment 30 by means of the condensing container(s) 34, through duct(s) 36, without carrying therewith any contaminating radiation or radioactive material. The closed cooling system, moreover, is continuous and passive with the gravity return of cooled and condensed liquid from a condensing container 34 through duct 36 to a closed heat transferring container 32 whereupon the recycled liquid is available for further heat conveyance.

Figure 3:
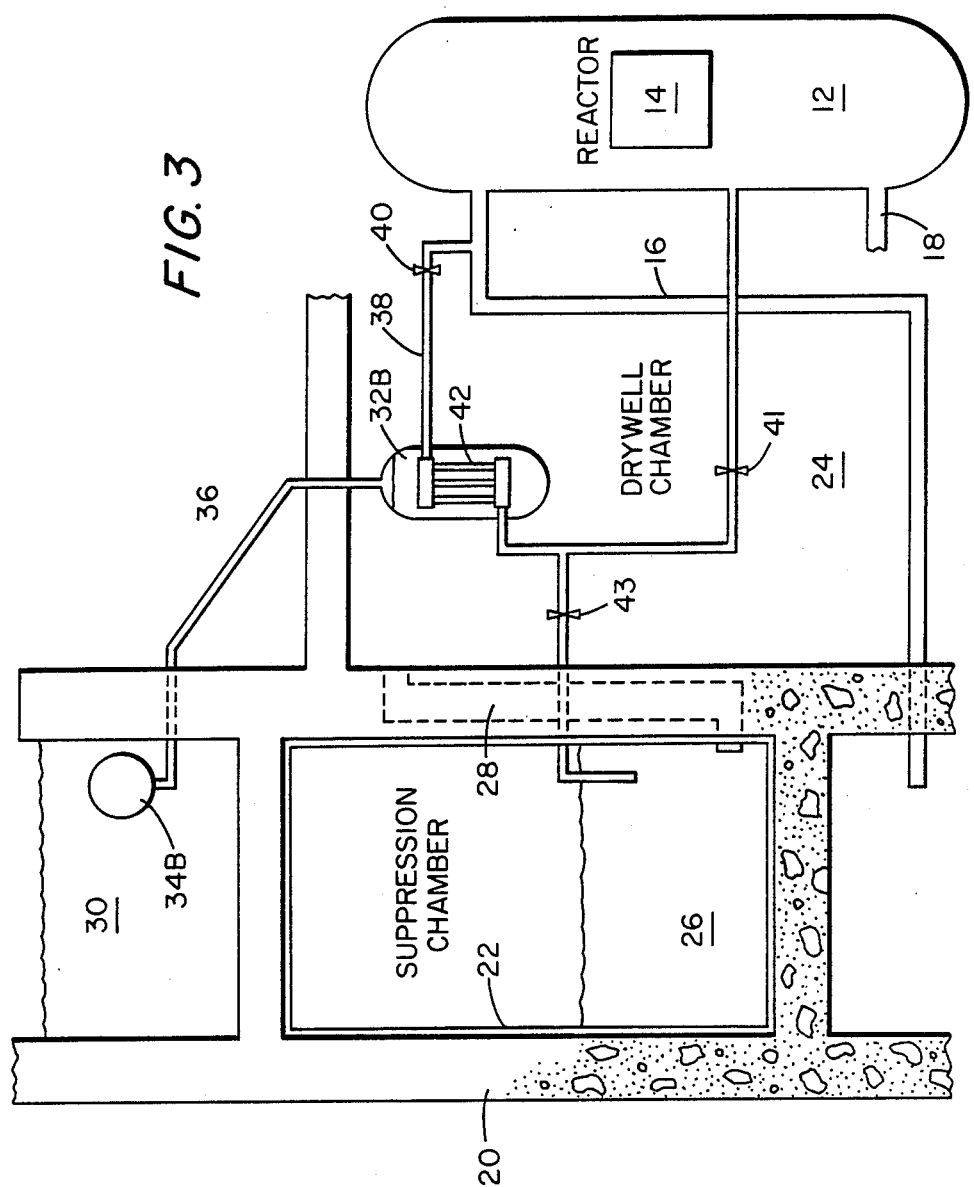
FIG. 3 is a detailed, enlarged sectional view of a portion of a suppression pool chamber and overhead cooling pool compartment with a reactor pressure vessel and drywell chamber.

Referring to FIG. 3, another embodiment of the closed cooling system of this invention comprises a heat transferring container(s) 32B holding a volatile liquid, and having a closed circuit pipe 38 passing through its interior in contact with the liquid contents thereof. Pipe 38 is in fluid contact with the pressure vessel 12, via, valve 40 and either coolant circulating pipe 16 or 18, or both. Pipe 38 can be arranged to make a complete circuit with the pressure vessel 12, passing through heat transferring container 32B, or can be extended into a suppression pool chamber for discharge as shown to cool and/or condense within the pool, depending upon whether valve 41 or valve 43 is open. The suppression pool chamber 26 can be cooled by the foregoing embodiment of this invention.

In any of the foregoing arrangements, pipe 38 carries excess thermal energy from its source through the volatile liquid retained in closed heat transferring container(s) 32B in pipes 42 whereby thermal energy is removed in the vaporization of the liquid of container(s) 32B. The heat vaporized liquid is transmitted through duct(s) 36 into condensing container(s) 34B located in a cooling compartment 30, where it is condensed, giving up the thermal energy. The condensed liquid returns by gravity flow from the closed condensing container 34B through duct 36 to the closed heat transferring container 32B where it becomes available for another heat conveying cycle.

Figure 4:
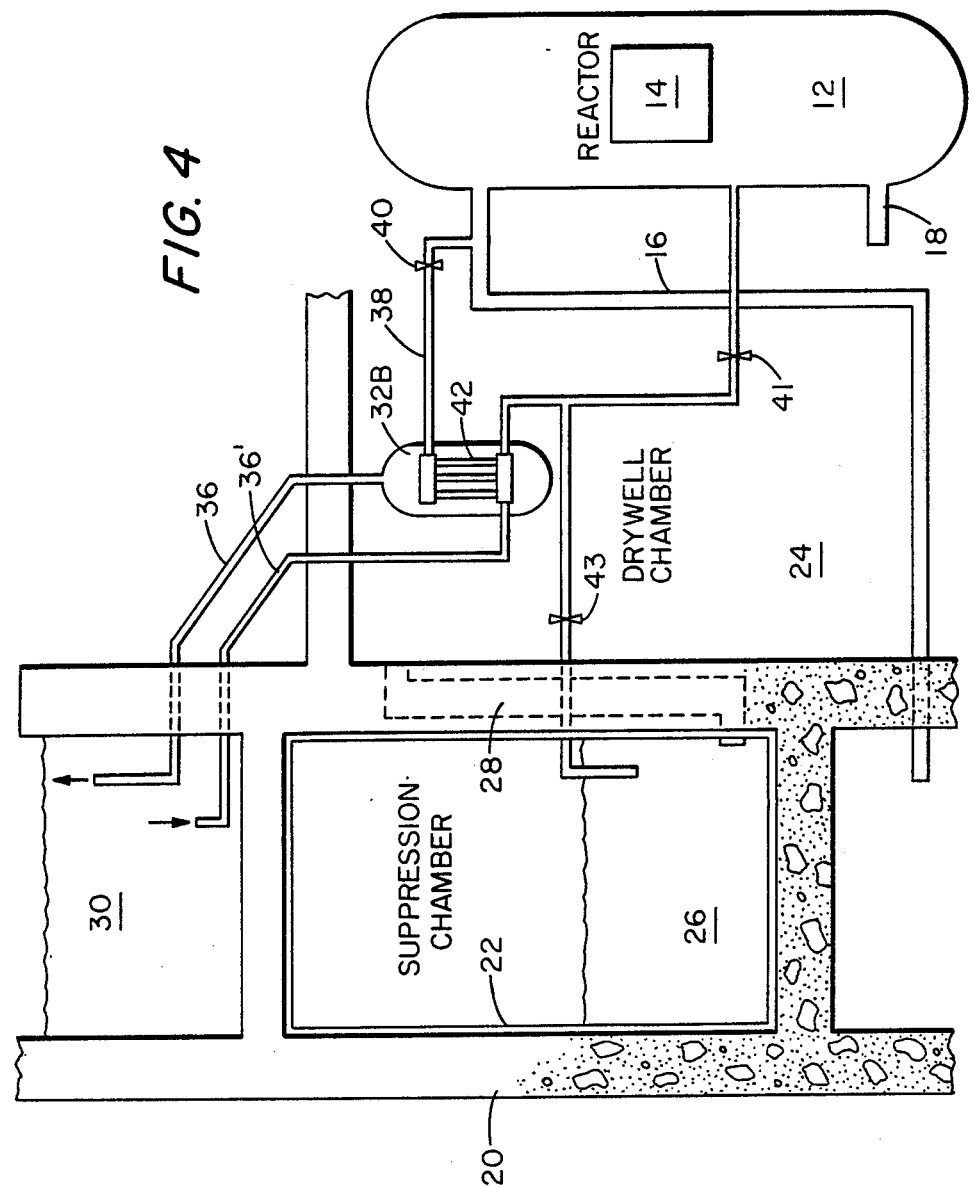
FIG. 4 is a detailed, enlarged sectional view of a portion of a suppression pool chamber and overhead cooling pool compartment with a reactor pressure vessel and drywell chamber.

FIG. 4 illustrates a variation on the closed cooling system embodiment of FIG. 3 described above. Heat transferring container(s) 32B is provided with one or more ducts 36 ($36^1$) for making a circulating loop fluid connection with a cooling compartment 30 which serves as a condensing container 34. That is the liquid contents of heat transferring container(s) 32B is heated by the fluid contents of pipe 42 passing therethrough from pipe 38, and/or the surrounding ambient atmosphere about the reactor pressure vessel, and vaporized. The vaporized liquid passes through duct 36 into the pool of a cooling compartment 30, condenses giving up heat, and liquid of the pool returns through duct $36^1$ to the heat transferring container 32B for another heat moving recycle.

Figure 5:
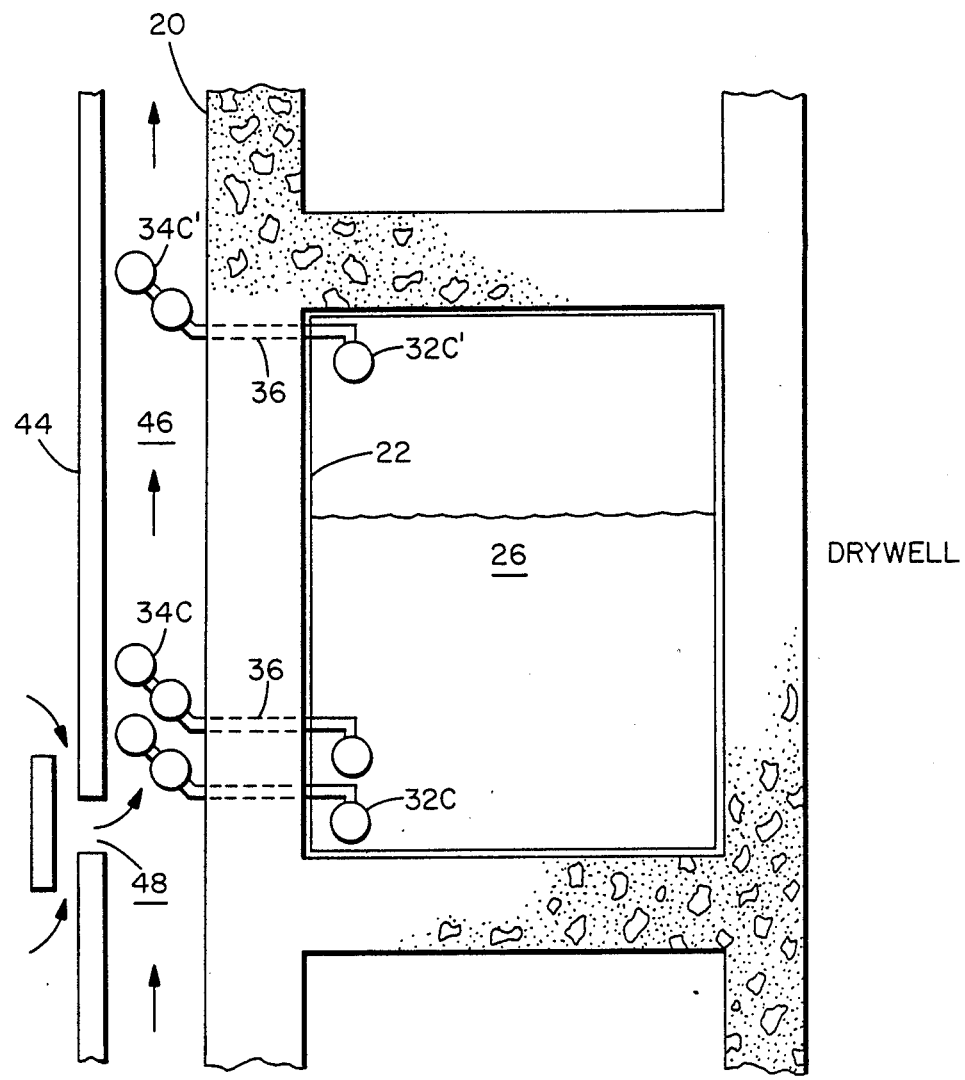
FIG. 5 is a detailed, enlarged sectional view of a portion of a suppression pool chamber and exterior of the containment housing.
Figure 6:
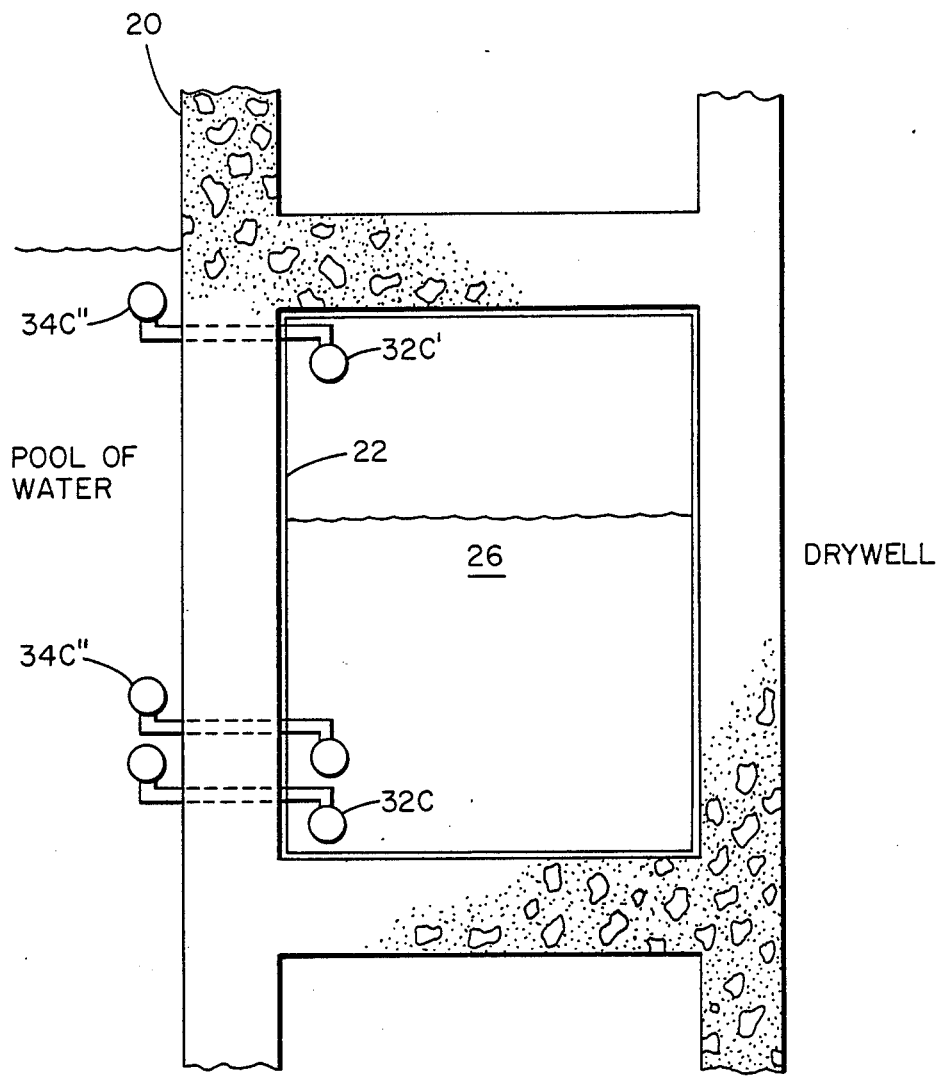
FIG. 6 is a detailed, enlarged sectional view of a portion of a suppression pool chamber and exterior of the containment housing.

A further embodiment of the closed cooling system of this invention, with two variations is illustrated in FIGS. 5 and 6. According to this version of the invention, the heat transferring container(s) 32C is placed in the suppression pool chamber 26, either submerged in the pool of liquid retained therein, or above the surface thereof as shown in $32C^1$. The corresponding condensing container(s) 34C is located outside the reactor containment housing structure 20 and at least one duct 36 provides a fluid communication between the internal closed heat transferring container(s) 32C and its counterpart external closed condensing container(s) 34C. The mechanism of heat transfer cooling is the same as in the other embodiments, namely excessive thermal energy entering the suppression pool chamber 26 vaporizes the liquid held in the heat transferring container 32C. The vaporized liquid passes through duct(s) 36 into the condensing container(s) 34C outside the reactor structure and is condensed in the cooler environment by giving up its heat of vaporization. Then the cooled and condensed liquid gravity flows from the closed condensing container(s) 34C through duct(s) 36 back to the heat transferring container 32C for repeating the heat transporting and dispensing cycle.

The variation of FIG. 5 comprises the positioning of the condensing container(s) 34C in a flue-like arrangement which induces an accelerated air or other gas flow therethrough. For example, as shown in the drawing of FIG. 5, a flue wall 44 is arranged spaced outward from the reactor containment housing 20 outer wall to provide a flue channel 46 for induced air flow. Flue entry openings 48 can be placed along the length of the flue as well as at the bottom to increase the cooling air flow over and about the external closed condensing container(s) 34C. To enhance to cooling efficiency by increasing cooling surface area, the external closed condensing container(s) 34C can be provided as small interconnecting multiples of two, three or more as shown.

The variation of FIG. 6 comprises the positioning of the closed condensing container(s) $34C^{11}$ out beyond the reactor containment housing 20 and submerged in a relatively large body of cooling liquid such as water, for example a pond, lake or lagoon.

The operation of the several passive cooling embodiments are each based on convection heat transfer and gravity flow to maintain continuous cooling circulation. The closed cooling circuit consists of fluid flow from the heat transferring containers through the fluid communicating ducts to the condensing containers and return. Water or other apt liquid retained in the heat transferring containers boils or vaporize when encountering increased surrounding temperatures, thereby absorbing thermal energy. The vapor, or steam, flows through the ducts into the higher condensing container which is surrounded in a cooling environment or heat sink, such as a cooling fluid body. The vapor or steam is cooled and condensed, giving up the absorbed thermal energy. The condensed liquid, devoid of the transported thermal energy, flows by gravity from the condensing container through the duct back into the closed heat transferring container.

This cooling mechanism of the various embodiments of the invention is passive in that it is self-initiating and acting without manual or automated controls of values, pumps or other motive power. Cooling is provided through natural circulation of the heat removing liquid which is self-sustaining and recirculated by gravity. Thus, cooling of the reactor containment is provided for prolonged periods without external power or personnel action.

Moreover, the heat transferring liquid is isolated from the contaminated materials within the containment by being completely enclosed within the cooling system. The closed cooling system therefore can extend out through the reactor containment structure to the exterior ambient atmosphere whereby thermal energy is conveyed out beyond the structure while prohibiting escape of any radiation or radioactive material.

What is claimed is:

1. A passive cooling, natural circulation system for the containment structure of a nuclear reactor plant which is isolated from contaminated material within the reactor containment and provides overpressure protection within the containment housing, consisting essentially of the combination of a nuclear reactor assembly including a containment housing surrounding a pressure vessel having a heat producing core of fissionable fuel enclosed therein and at lease one conduit in fluid communication with the interior of the pressure vessel extending out therefrom, a drywell chamber adjacent to said pressure vessel, a suppression pool chamber for retaining a cooling liquid and having a conduit providing fluid communication between said drywell chamber and suppression pool chamber, and a cooling system being closed to contaminating radioactive fission products from within the nuclear reactor containment housing and consisting of a heat transferring container holding a volatile liquid positioned within the containment housing at a location for intercepting excessive thermal energy leaking from the pressure vessel and its communicating conduits, and a condensing container connected in closed circuit fluid communication through at least one duct to the heat transferring container said cooling system consisting of the heat transferring container and the condensing container with their connecting fluid communicating duct being closed to isolate the cooling system from contaminated material within the containment housing, wherein the heat transferring container holding a volatile liquid includes therein a pipe making a fluid circuit with the pressure vessel whereby excessive thermal energy from the pressure vessel is carried within the pipe into the heat transferring container and transferred to the volatile liquid therein for conveyance to the condensing container.

2. The passive cooling, natural circulation closed system of claim 1, wherein the condensing container comprises a cooling liquid container having a condensing liquid therein and the heat transferring container holding a volatile liquid is in fluid communication therewith through at least one duct.

3. The passive cooling, natural circulation closed system of claim 1, wherein the condensing container is submerged in pool of cooling liquid retained in a cooling compartment.

4. A passive cooling, natural circulation system for the containment structure of a nuclear reactor plant which is isolated from contaminated material within the reactor containment and provides overpressure protection within the containment housing, consisting essentially of the combination of a nuclear reactor assembly including a containment housing surrounding a pressure vessel having a heat producing core of fissionable fuel enclosed therein and at least one conduit in fluid communication with the interior of the pressure vessel extending out therefrom, a drywell chamber adjacent to said pressure vessel, a suppression pool chamber for retaining a cooling liquid and having a conduit providing fluid communication between said drywell chamber and suppression pool chamber, and a cooling system being closed to contaminating radioactive fission products from within the nuclear reactor containment housing and consisting of a heat transferring container holding a volatile liquid positioned within the drywell chamber and said heat transferring container having a pipe passing therethrough and making a fluid circuit with the pressure vessel whereby excessive thermal energy from the pressure vessel is carried within the pipe through the heat transferring container, and a condensing container connected in closed circuit fluid communication through at least one duct to the heat transferring container whereby the thermal energy from the pressure vessel is conveyed from the heat transferring container to the condensing container said cooling system consisting of the heat transferring container and the condensing container with their connecting fluid communication duct being closed to isolate the cooling system from contaminated material within the containment housing.

5. The passive cooling, natural circulating closed system of claim 4, wherein the condensing container is located submerged in a liquid pool.

6. The passive cooling, natural circulating closed system of claim 4, wherein the condensing container comprises a compartment containing a liquid pool.

7. A passive cooling, natural circulation system for the containment structure of a nuclear reactor plant which is isolated from containment material within the reactor containment and provides overpressure protection within the containment housing, consisting essentially of the combination of a nuclear reactor assembly including a containment housing surrounding a pressure vessel having a heat producing core of fissionable fuel enclosed therein and at least one conduit in fluid communication with the interior of the pressure vessel extending out therefrom, a drywell chamber adjacent to said pressure vessel, a suppression pool chamber for retaining a cooling liquid and having a conduit providing fluid communication between said drywell chamber and suppression pool chamber, and a cooling system being closed to contaminating radioactive fission products from within the nuclear reactor containment housing and consisting of a heat transferring container holding a volatile liquid positioned within the drywell chamber and said heat transferring container having a pipe passing therethrough and making a fluid circuit with the pressure vessel whereby excessive thermal energy from the pressure vessel is carried within the pipe through the heat transferring container, and a condensing container submerged in a liquid pool within a compartment which is connected in closed circuit fluid communication through at least one duct to the heat transferring container whereby the thermal energy from the pressure vessel is conveyed from the heat transferring container to the condensing container said cooling system consisting of the heat transferring container and the condensing container with their connecting fluid communicating duct being closed to isolate the cooling system from contaminated material within the containment housing.

* * * * *